United States Patent
Hsieh

(10) Patent No.: US 8,497,711 B2
(45) Date of Patent: Jul. 30, 2013

(54) ENVELOPE DETECTOR AND ASSOCIATED METHOD

(75) Inventor: Yi-Cheng Hsieh, Hsinchu County (TW)

(73) Assignee: MStar Semiconductor, Inc., Zhubei (TW)

( * ) Notice: Subject to any disclaimer, the term of this patent is extended or adjusted under 35 U.S.C. 154(b) by 91 days.

(21) Appl. No.: 13/235,629

(22) Filed: Sep. 19, 2011

(65) Prior Publication Data

US 2012/0314816 A1    Dec. 13, 2012

(30) Foreign Application Priority Data

Jun. 8, 2011 (TW) ............................. 100120047 A

(51) Int. Cl.
*H03K 5/153*    (2006.01)
(52) U.S. Cl.
USPC .................. 327/58; 327/65; 327/72

(58) Field of Classification Search
USPC ...................... 327/58, 62, 63, 65, 72
See application file for complete search history.

(56) References Cited

U.S. PATENT DOCUMENTS

| | | | |
|---|---|---|---|
| 6,504,403 B2 * | 1/2003 | Bangs et al. | 327/62 |
| 6,897,712 B2 * | 5/2005 | Ficken et al. | 327/537 |
| 7,116,948 B2 * | 10/2006 | Chien | 455/115.3 |

* cited by examiner

*Primary Examiner* — Quan Tra
(74) *Attorney, Agent, or Firm* — WPAT, PC; Justin King

(57) ABSTRACT

An envelope detecting method performing squelch detection on a pair of differential signal includes: by a voltage divider, providing a real-time reference signal according to a sum of the pair of differential signals; and comparing two comparison signals associated with the real-time reference signals and the pair of differential signals to generate a squelch detection signal.

12 Claims, 8 Drawing Sheets

ENVELOPE DETECTOR AND ASSOCIATED METHOD

This application claims the benefit of Taiwan application Serial No. 100120047, filed Jun. 8, 2011, the subject matter of which is incorporated herein by reference,

BACKGROUND OF THE INVENTION

1. Field of the Invention

The invention relates in general to an envelope detector and associated method, and more particularly, to a low-cost, low-power consumption, simple structured and compact envelope detector, suitable for high frequency differential signal squelch detection, and associated method.

2. Description of the Related Art

A modern communication system usually comprises a mechanism for distinguishing whether an input signal is a to-be-processed signal carrying valid information, or simply noise. In general, an input/output (IO) interface of a communication system chip is coupled to an external electronic device/circuit/chip via a cable and/or a trace on a circuit board in order to receive information/messages transmitted from the external electronic device/circuit/chip. For example, an IO interface of a communication system chip may comprise an input port, e.g., a pair of differential input pads, for receiving data of differential transmission (e.g., information and/or digital payload).

The communication system chip performs squelch detection on a signal level (e.g., a voltage level) at the input port to identify whether the signal on the input port carries valid data. When no data is transmitted from a remote electronic device/circuit/chip, or a remote electronic device/circuit/chip is disconnected to the input port of the communication system chip, the signal on the input port of the chip contains only noise but not any valid data. Therefore, the communication system chip comprises a squelch detector coupled to the input port, for performing squelch detection on the input port to identify whether the signal on the input port is noise or real data. The squelch detector provides a squelch detection signal to reflect a detection result. When the signal on the input port is determined as carrying real data, a digital data circuit for interpreting data in the communication system chip then starts retrieving and interpreting the data in the signal according to the indication of the squelch detection signal.

FIG. 1 shows a schematic diagram of a conventional squelch detector 10; FIG. 2 shows a timing diagram of waveforms of associated signals in FIG. 1, with a horizontal axis representing the time and a vertical axis representing a signal level. The squelch detector 10 comprises a summing and subtraction circuit 12, a reference level generator 14, a mixer 16, a comparator 18, a sampling circuit 20, and a supporting circuit 22. The supporting circuit comprises a clock generator 24, a bias circuit 26, and a regulator 28.

Operations of the convention squelch detector 10 are described as follows. The summing and subtraction circuit 12 receives an input port signal Vin. For example, the signal Vin comprises a pair of differential signals, which are represented by waveforms in a solid line and a dotted line. The reference level generator 14 generates a plurality of quantized reference levels. The summing and subtraction circuit 12 then generates differential signals Vin1 and Vin2 according to the level of the signal Vin and the quantized reference levels. The signal Vin1 corresponds to the signal Vin, while the signal Vin2 is a reference signal for squelch comparison. The mixer 16 performs mixing (e.g., multiplication) on the signals Vin1 and Vin2 to forcibly amplify the signals to further generate a signal Vinc and a reference level Vref0. The signal Vinc corresponds to the waveform of the signal Vin, and the reference level Vref0 is a constant envelope comparison standard. The comparator 18 compares the signal Vinc and the reference level Vref0, and reflects a comparison result in a signal Vcp. For example, when the signal Vinc is greater than the reference level Vref0, the signal Vcp is at a high level, or else the signal is at a low level. The sampling circuit 20 performs high-speed sampling on the signal Vcp according to a sampling clock CKS to obtain a continuous squelch detection signal for determining whether the signal Vin is a to-be-processed signal carrying real data. For example, when the signal Vcp stays at the high level for a predetermined period, it is determined that the signal Vin carries real data.

In the conventional squelch detector 10, the summing and subtraction circuit 12 requires a large resistance to form a voltage dividing network in order to generate the reference signal for squelch comparison. The provision of the voltage dividing network is not only highly power consuming but also occupies a large layout area. To support operations of the summing and subtraction circuit 12, the supporting circuit 22 also needs to include the voltage regulator 28 and the bias circuit 26 to generate a constant voltage level. Meanwhile, the mixer 16 multiplying and amplifying the signals is also quite power consuming.

Furthermore, it is necessary for the comparator 18 to be a high-speed comparator. In the modern 10 technique, high-speed signals are utilized to carry high-speed data/messages in order to increase a data/message transmission rate. Since the comparator 18 is required to compare high-frequency signals and send out high-frequency results, it is necessary for the comparator 18 to be a high-speed comparator; whereas, the high-speed comparator also suffers from the drawbacks of having high power consumption and a large layout area. Similarly, for that the sampling circuit 20 samples the high-speed comparison results from the comparator 18 and determines the squelch according to the accumulated sampling results, the sampling circuit 20 needs to operate at an even higher speed sampling clock rate, meaning that a significant power consumption is required. To support operations of the sampling circuit 20, the supporting circuit 22 further comprises the clock generator 24 to generate the high-frequency sampling clock CKS that again increases the consumption of power and area. In addition, misjudgment is likely to be incurred when the squelch is determined solely based on sampling.

The input port of a chip is prone to coupling to various noises and interferences via the cable and/or the trace on the circuit board. For example, when the remote electronic device is connected to the input port via the cable, a transient state is transmitted to the input port of the chip. For the differential input pads on the input port that receive a pair of differential signals, the transient state is at the same time and with a same phase coupled to the pair of differential signals to undesirably affect common mode parts of the differential signals. At this point, the pair of differential signals are increased due to the transient state. Since the conventional squelch detector 10 compares and performs the squelch detection based on a constant reference level, the transient state is determined as data due to the high level of the transient state, such that the digital data circuit starts data retrieval with respect to the signal on the input port. However, regardless of whether the signal on the input port carries real data, the signals are already distorted being affected by the transient state, and any data obtained from data retrieval is hence erroneous. More specifically, the conventional squelch detector 10 is incapable of eliminating undesirable effects of the common mode noise resultant from the transient state.

SUMMARY OF THE INVENTION

Compared to noise with smaller amplitude, data is carried in a signal with larger amplitude, in a way that comparison of a level and an envelope of signals at an input port may be utilized as basis for squelch detection. Therefore, the present invention is directed to an envelope detector for squelch detection and associated method capable of overcoming the drawbacks associated with the prior art.

According to an aspect of the present invention, an envelope detector is provided for performing squelch detection on a pair of differential signal and providing a corresponding squelch detection signal. The envelope detector comprises a voltage divider and a comparison module. The voltage divider provides a real-time reference signal according to a sum (e.g., a real-time summed average) of the differential signals. With respect to the reference signal and a first comparison signal and a second comparison signal associated with the differential signal, the comparison module compares the first comparison signal and the second comparison signal to generate the squelch detection signal. The first and second comparison signals are low-frequency signals. For example, frequency ranges of the first and second comparison signals are lower than that of the pair of differential signals.

In an embodiment, the comparison module comprises a transfer circuit, first to third load circuits, a comparator, first and second integrators, and first and second buffer circuits. The transfer circuit is coupled to a first node and a second node, and provides a differential current according to the differential signals and the reference signal. The first load circuit, coupled to the first node and a third node, comprises a first resistor and provides the first comparison signal according to a voltage formed at the first resistor by the differential current. The second load circuit, coupled to the second node and a fourth node, comprises a serial resistor and provides the second comparison signal according to a voltage formed at the serial resistor by the differential current. A resistance of the serial resistor differs from that of the first resistor. The comparator, coupled to the third node and the fourth node, provides the squelch detection signal by comparing the first comparison signal and the second comparison signal.

The third load circuit, coupled between the third node and a fifth node, comprises a second resistor. A sum of the resistance of the first and second resistors equals the resistance of the serial resistor. The first integrator, coupled between the fifth node and a seventh node, generates a first integration result by integrating a first input signal associated with the differential signals. The second integrator, coupled between the fourth node and an eighth node, generates a second integration result by integrating a second input signal associated with the real-time reference signal. The first integration signal is associated with the first comparison signal, and the second integration signal is associated with the second comparison signal. The transfer circuit provides the differential current according to the first and second integration results.

The first buffer circuit comprises a pair of first input ends and a first coupling end for generating the first input signal according to the pair of differential signals. The pair of first input ends are respectively coupled to the pair of differential signals; the first coupling end is coupled to the first integrator. The second buffer circuit comprises a second input end and a second coupling end, which are respectively coupled to the real-time reference signal and the second integrator, and generates the second input signal according to the reference signal.

In an embodiment, the first buffer circuit comprises a pair of first transistors. The pair of first transistors have gates respectively coupled to the pair of first input ends, drains coupled to the first coupling end and sources coupled to the first node. The second buffer circuit comprises a pair of second transistors. The pair of second transistors have gates respectively coupled to the second input end, drains coupled to the second coupling end and sources coupled to the second node.

In an embodiment, the first integrator comprises a first integration transistor and a first capacitor. The first integration transistor has its drain and gate respectively coupled to the fifth node and the seventh node, and the first capacitor coupled to the fifth and seventh nodes. The second integrator comprises a second integration transistor and a second capacitor. The second integration transistor has its drain and gate respectively coupled to the fourth node and the eighth node, and the second capacitor coupled to the fourth and eighth nodes.

In an embodiment, the comparison module further comprises first to fourth current sources respectively coupled to the first, second, seventh and eighth nodes. A current difference between the third current source and the third current source equals that between the second current source and the fourth current source.

According to another aspect of the present invention, an envelope detector is provided for performing squelch detection on a pair of differential signals to generate a corresponding squelch detection signal. The envelope detector comprises a voltage divider and a comparison module. The voltage divider provides a real-time reference signal according to a sum (e.g., a real-time summed average) of the differential signals. The voltage divider provides a real-time reference signal according to a common mode part of the differential signals. The comparator compares the real-time reference signal and an envelope level of an envelope of the pair of differential signals to perform squelch detection and to generate the squelch detection signal. The first and second comparison signals are low-frequency signals. The comparison module comprises an integration circuit and a digital block. The integration circuit comprises a node capable of integration to accumulate an integration signal associated with a difference between the pair of differential signals and the real-time reference signal. The digital block reverses a logic level of the squelch detection signal when the integration signal is greater than a predetermined value associated with the pair of differential signals.

According to yet another aspect of the present invention, a method for envelope detection is provided for performing squelch detection on a pair of differential signal to generate a corresponding squelch detection signal. The method comprises: generating a real-time reference signal according to a difference between the pair of differential signals; and comparing a first comparison signal and a second comparison signal with respect to the real-time reference signal and the first and second comparison signal associated with the differential signals to generate the squelch detection signal. The first and second comparison signals are low-frequency signals. The real-time reference signal is associated with a real-time summed average of the paired differential signals.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
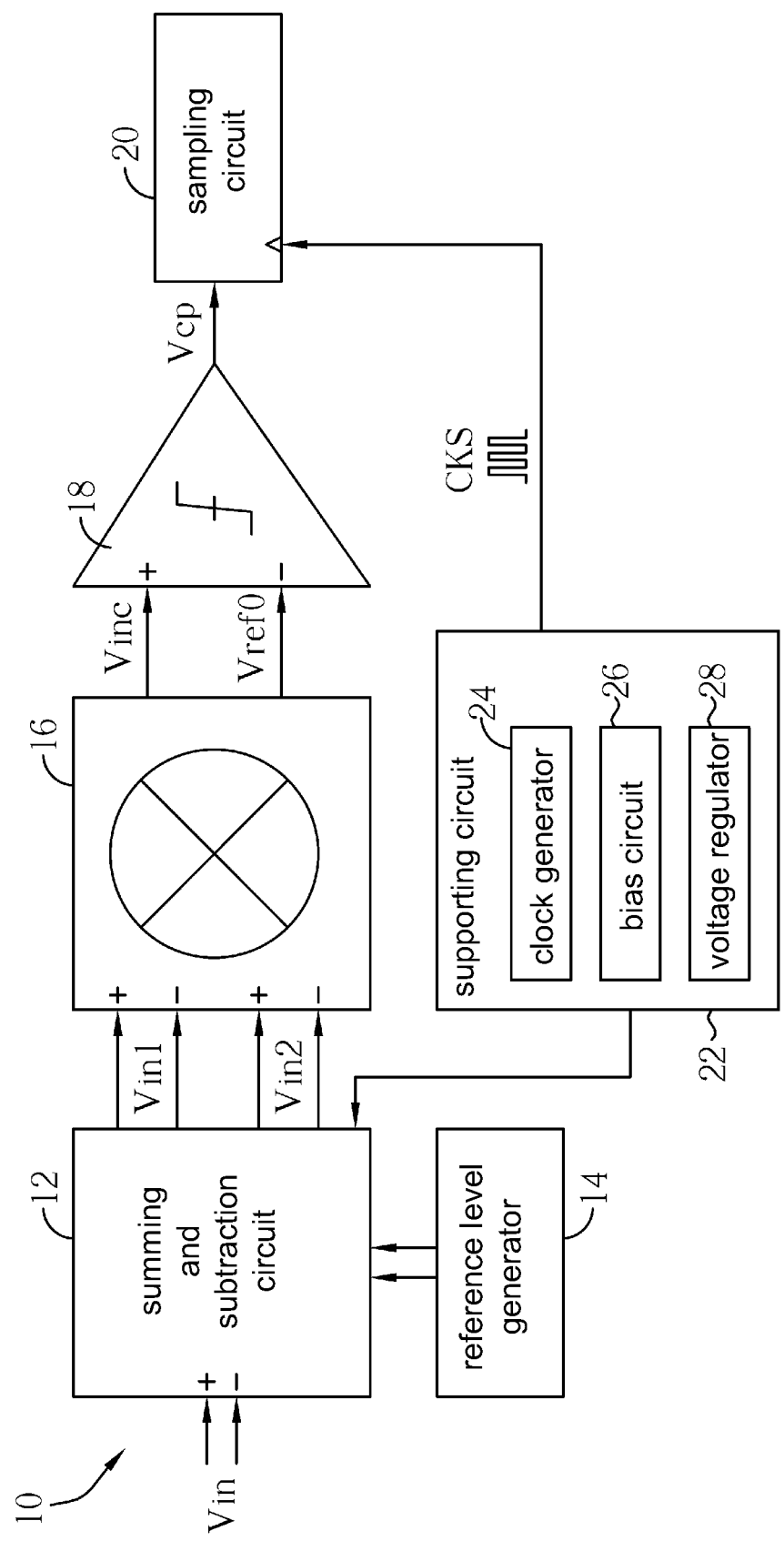
FIG. 1 is a schematic diagram of a conventional squelch detector.
Figure 2:
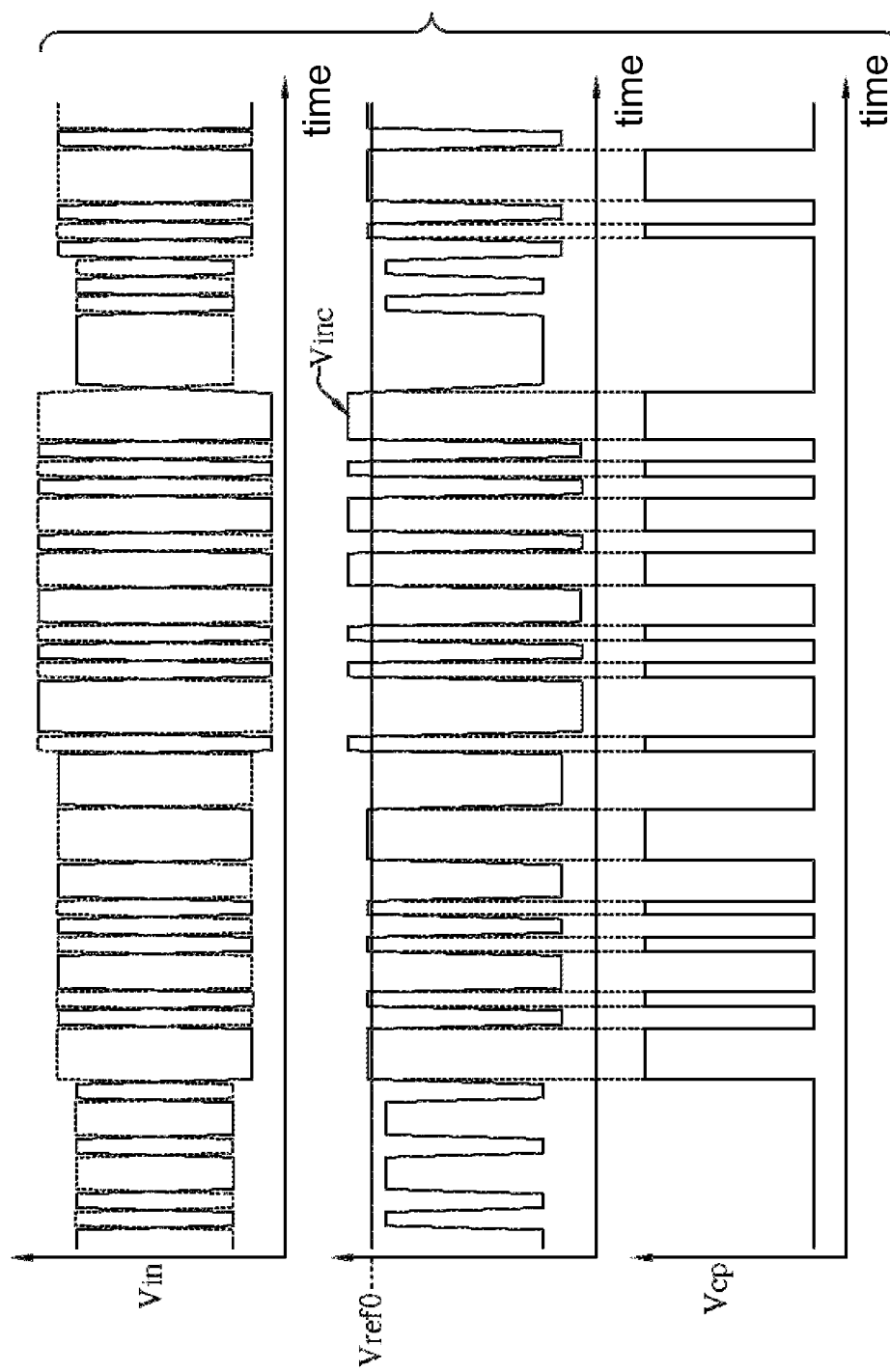
FIG. 2 is a schematic diagram showing operations of a squelch detector.
Figure 3:
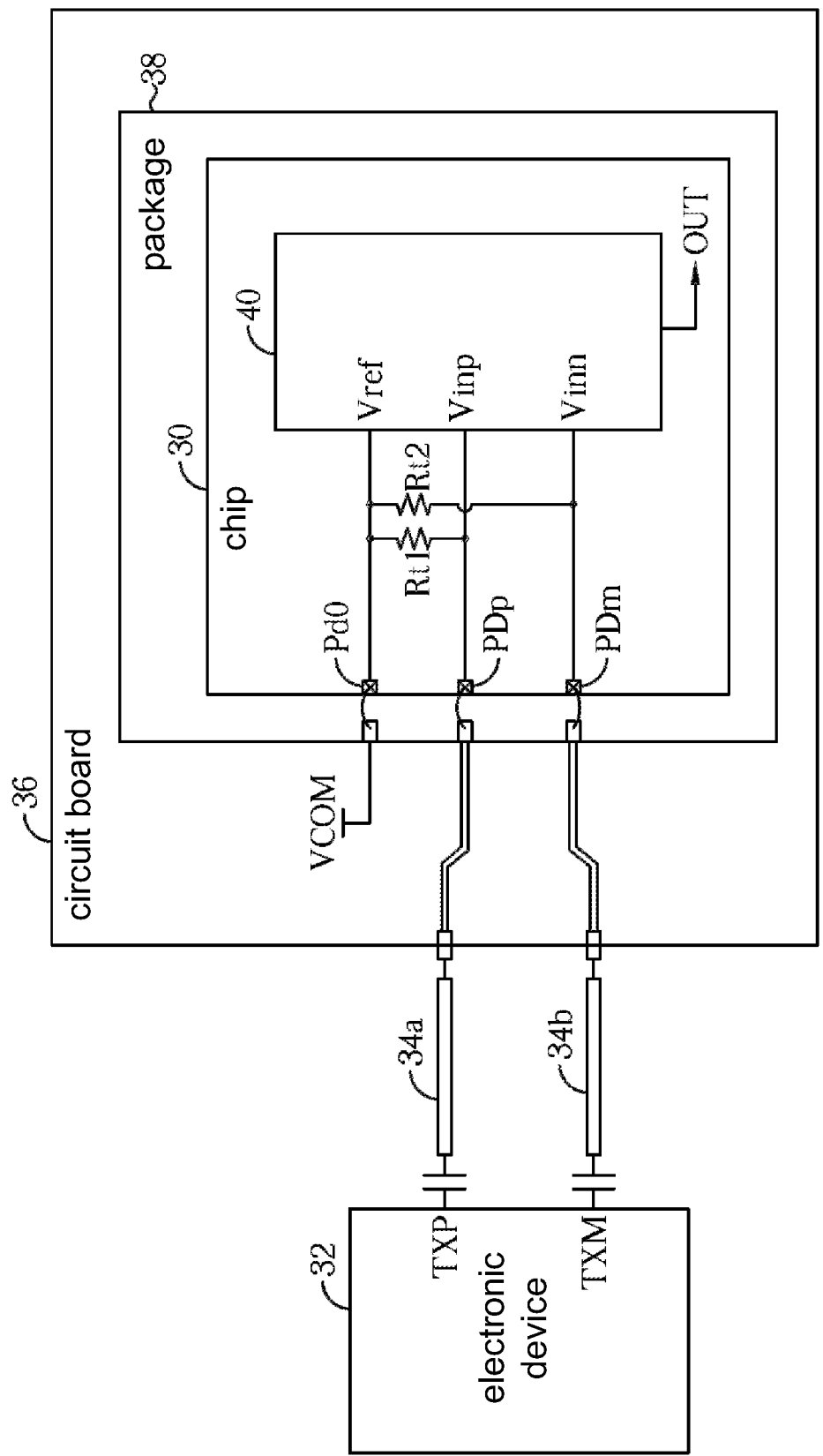
FIG. 3 is a schematic diagram of an envelope detector provided in a chip according to an embodiment of the present invention.

FIG. 3 shows a schematic diagram of an envelope detector 40 according to an embodiment of the present invention configured in a chip (e.g., an integrated circuit or a die) 30. The chip 30 is packaged in a package 38, and is disposed on a circuit board (e.g., a printed circuit board) 36. A remote electronic device 32 outputs differential data via a pair of output ends TXP and TXM to the chip 30. The output ends TXP and TXM are respectively coupled to a connector of the circuit board 36 via cables 34a and 34b, and then coupled to a pair of differential input pads PDp and PDm via traces on the circuit board as well as pins and bonding of the package 38. The envelope detector 40 configured in the chip 30 performs the squelch detection on paired differential signals Vinp and Vinn on the pads PDp and PDm to provide a signal OUT as the squelch detection signal. The signal OUT from the envelope detector 40 may be utilized in conjunction with a data retrieving digital data circuit (not shown) in the chip 30. The digital data circuit starts/stops to retrieve data (e.g., messages and/or payloads) in the signal according to the indication of the signal OUT.

The chip 30 further comprises a pad Pd0 (e.g., a power pad) coupled to a voltage VCOM (e.g., a direct-current voltage) to provide a signal Vref. Between the pads Pd0 and PDp, and Pd0 and PDm, are respectively two resistors Rt1 and Rt2 that match each other in resistance. The resistors Rt1 and Rt2 are terminal resistors of the cables 34a and 34b. For example, the resistance of the resistors Rt1 and Rt2 are both 50 Ohms. The resistors Rt1 and Rt2 also respectively couple the signal Vref to the signals Vinp and Vinn to provide a common mode voltage to the paired differential signals.

Figure 4:
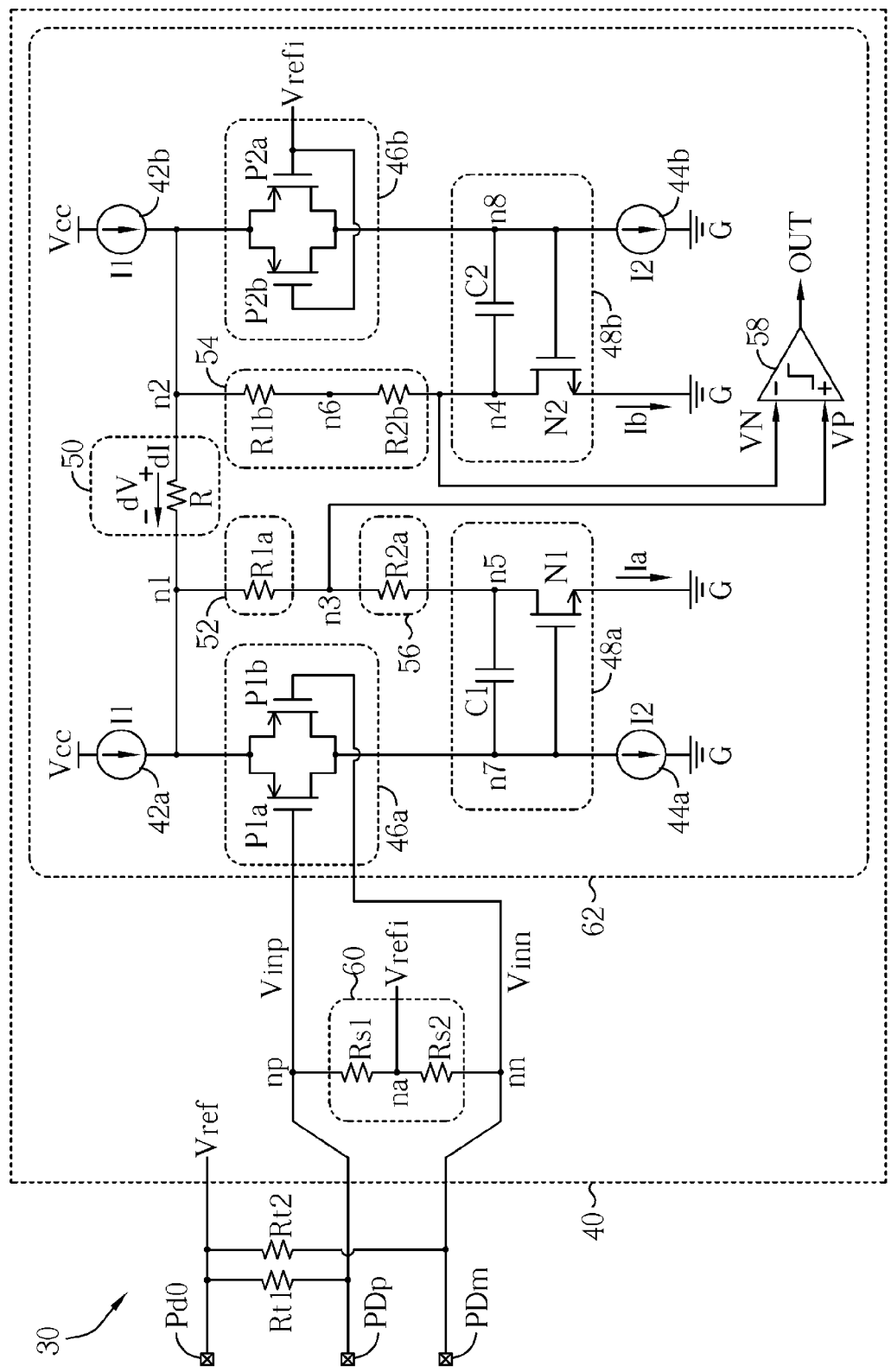
FIG. 4 is a schematic diagram of a squelch detector according to an embodiment of the present invention.

FIG. 4 shows a circuit schematic diagram of the envelope detector 40 according to an embodiment of the present invention. The envelope detector 40 comprises a voltage divider 60 and a comparison module 62. The voltage divider 60 provides a signal Vrefi (i.e., a real-time reference signal) according to a real-time summed average of the differential signals Vinp and Vinn. With respect to the reference signal Vrefi and signals VP and VN associated with the differential signals Vinp/Vinn, the comparison module 62 compares the signals VP and VN to generate the squelch detection signal OUT.

In the embodiment of FIG. 4, the voltage divider 60 comprises two resistors Rs1 and Rs2. The resistor Rs1 is coupled between nodes np and na, and the resistor Rs2 is coupled between nodes nn and na. For example, the resistors Rs1 and Rs2 are matching resistors with identical resistance. The nodes np and nn are respectively coupled to the signals Vinp and Vinn. As a result, the signal Vrefi provided by the voltage divider 60 at the node na equals to a real-time summed average of the signals Vinp and Vinn. More specifically, the signal Vrefi is a common mode part of the differential signals Vinp and Vinn. Since the comparison module 62 compares the envelope level on the signals Vinp and Vinn, an effect of a transient state in the common mode part is effectively eliminated. In an embodiment of the present invention, the resistance of the resistors Rs1 and Rs2 may be one tenfold to several tenfolds of that of the resistors Rt1 and Rt2, and thereby the function of the resistors Rt1 and Rt2 as terminal resistors remain unaffected.

Figure 5:
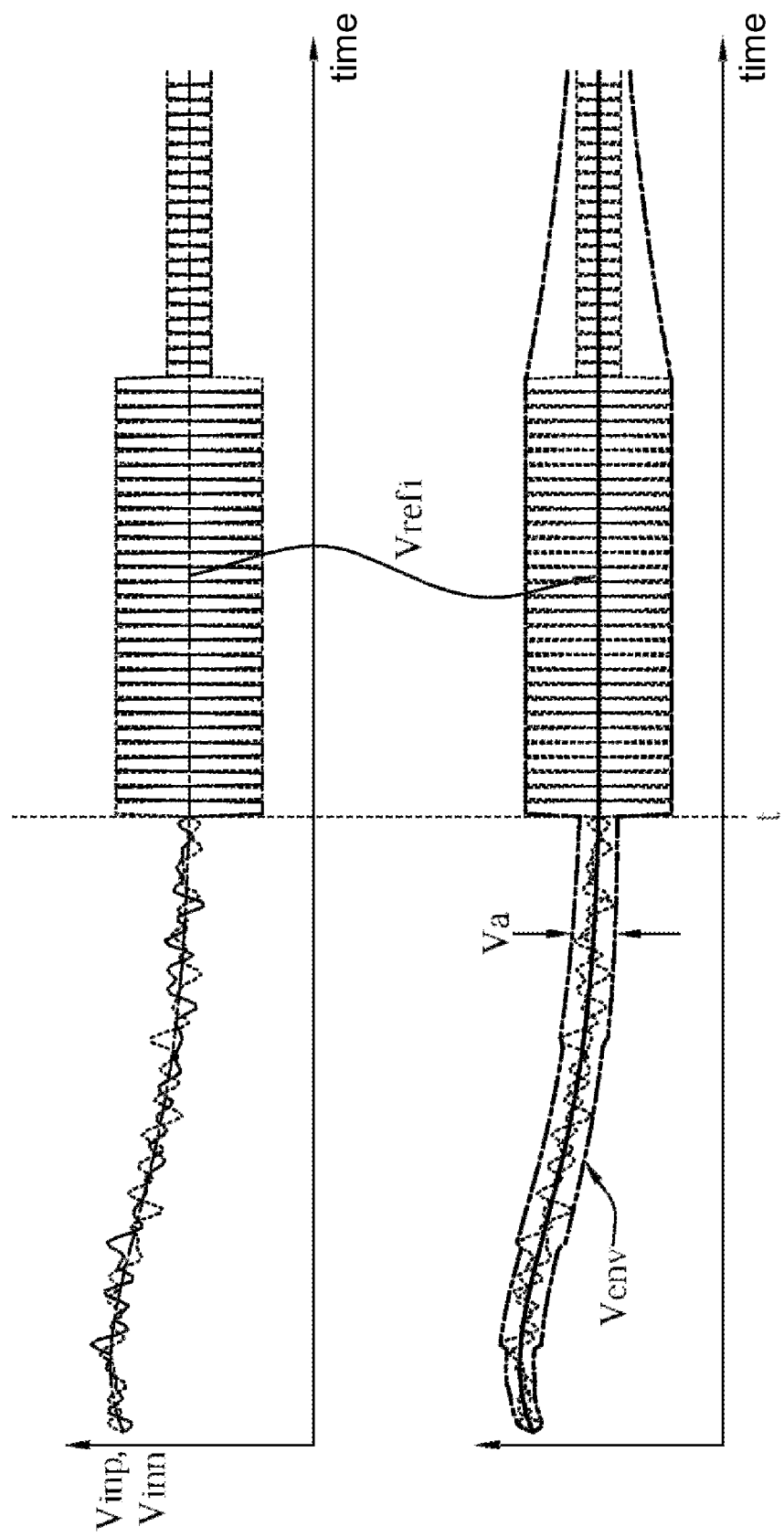
FIG. 5 is a schematic diagram showing operations of a squelch detector in FIG. 4.

FIG. 5 shows a schematic diagram illustrating operations according to an embodiment of the present invention. The common mode part of the signals Vinp and Vinn is captured by the voltage divider 60 as a signal Vrefi, and the envelope of the signals Vinp and Vinn is represented by a signal Venv. In an embodiment, the comparison module 62 compares a deviation (an amplitude Va) between the signals Venv and Vrefi to perform the squelch detection. When the amplitude Va is small (e.g., smaller than a threshold amplitude), it means that the envelope is not significantly deviated from the common mode part of the differential signals Vinp and Vinn so that the signals Vinp and Vinn are determined as noise. Conversely, when the amplitude Va is large (e.g., greater than the threshold amplitude), it is determined that the signals Vinp and Vinn carry data.

Since the paired differential signals Vinp and Vinn vary with the common mode part, the enveloped signal Venv also changes along with the signal Vrefi, so that the deviation amplitude Va between the signal Venv and the signal Vrefi follow the difference between the signals Vinp and Vinn instead of being affected by the transient state of the common mode part. For example, before a time point t in FIG. 5, the signals Vinp and Vinn are both coupled to a transient state to drift the common mode part upwards such that the levels of the signals Vinp and Vinn are increased. In the prior art, a constant reference level is utilized for comparing and performing the squelch detection, and so the signals Vinp and Vinn are misjudged as carrying data due to their higher levels. In comparison, the present invention performs the squelch detection according to the amplitude Va, and thus the effects brought by the transient state of the common mode part are effectively eliminated.

As observed from FIG. 5, in contrast to the high frequency, high clock rate and high data speed signals Vinp and Vinn, the corresponding envelope signal Venv and the signal Vrefi corresponding to the common mode part are low-frequency signals with very moderate changes. It is to be noted that the comparison module 62 only needs to perform comparison on the low-frequency signals, and hence a high-frequency comparator is not required.

Again referring to the embodiment shown in FIG. 4, the comparison module 62 comprises two buffer circuits 46a and 46b, two integrators 48a and 48b, a transfer circuit 50, load circuits 52, 54 and 56, four current sources 42a, 42b, 44a and 44b, and a comparator 58.

The buffer circuit 46a (a first buffer circuit) comprises a pair of transistors P1a and P1b, which are p-channel metal oxide semiconductors (PMOS), for example. The buffer circuit 46a comprises a circuit structure similar to a source follower. The transistors P1a and P1b have gates serving as a pair of input ends respectively coupled to the signals Vinp and Vinn, drains coupled to an integrator 48a at a node n7, and sources coupled to a node n2. The transistors P1a, P1b, P2a, and P2b are matching transistors.

The integrator 48a (a first integrator) is coupled to nodes n7 and n5 and performs integration according to the signals Vinp and Vinn, so that the voltage at the node n5 serves as an integration signal reflecting an integration result. In equivalence, the integrator 48a is also a low-pass filter. In the embodiment shown in FIG. 4, the integrator 48a comprises a transistor N1 (a first integration transistor) and a capacitor C1 (a first capacitor). For example, the transistor N1 is an NMOS transistor, which has its drain, gate and source respectively coupled to the nodes n5 and n7 and a voltage G (e.g., ground). The capacitor C1 is coupled to the nodes n5 and n7. With the capacitor C1 coupled between the gate and drain of the transistor N1, the Miller effect (increase in the equivalent input capacitance of an inverting voltage amplifier due to amplification of the effect of capacitance between the input and output terminals) may be developed in the integrator 48a to amplify the capacitance provided by the capacitor C1 through transconductance (gm) of the transistor N1, so as to reinforce the integration capability of the integrator 48a to provide an even smaller low-pass frequency. In equivalence, even when the capacitor C1 is a small-sized capacitor, the Miller effect can nevertheless be applied to provide sufficient low-pass filter effects for the integrator 48a to filter and remove the high-frequency noise and interference (e.g., transition) in the envelope of the signals Vinp and Vinn.

An integrator 48b (a second integrator) is coupled to nodes n4 and n8, and performs integration according to the signal Vrefi, so that the voltage at the node n4 serves as an integration signal reflecting an integration result. To be symmetrical to the integrator 48a, the integrator 48b comprises a transistor N2 (a second integration transistor) and a capacitor C2 (a second capacitor). For example, the transistor N2 is an NMOS transistor, which has its drain, gate, and source respectively coupled to the nodes n4, n8 and the voltage G. The capacitor C2 is coupled to the nodes n4 and n8. For example, the transistors N1 and N2 are matching transistors, and the capacitors C1 and C2 are matching capacitors.

The current sources 42a and 42b (first and second current sources) may be identical and both provide a current I1. The current source 42a is coupled between a voltage Vcc and a node n1. For example, the voltage Vcc is a direct-current operating voltage greater than the ground voltage G. The current sources 44a and 44b (third and fourth current sources) may also be identical and both provide a current I2. The current source 44a is coupled between the node n7 and the ground voltage G, and the current source 44b is coupled between the node n8 and the ground voltage G. A current difference between the current sources 42a and 44a (I1−I2) equals that of the current sources 42b and 44b.

The transfer circuit 50 comprising a resistor R, coupled between the nodes n1 and n2, provides a differential current dl according to a voltage difference resulted between the nodes n1 and n2 by the signals Vinp and Vinn of the input buffer circuit 46a and the signal Vrefi of the buffer circuit 46b. The load circuit 52 (a first load circuit), coupled between the nodes n1 and n3, provides a signal VP (the first comparison signal) at the node n3 according to a voltage formed at a resistor R1a by the differential current dl. The load circuit 54 (a second load circuit), coupled between the nodes n2 and n4, provides a signal VN (the second comparison signal) at the node n4 according to a voltage formed by a serial resistor by the differential current dl. The serial resistor is formed by serially connecting a resistor R1b between the nodes n2 and n6 and a resistor R2b between the nodes n6 and n4. The load circuit 56 (a third load circuit), coupled between the nodes n3 and n5, comprises a resistor R2a. In an embodiment of the present invention, the resistors R1a and R1b are matching resistors with a resistance of R1, and the resistors R2a and R2b are matching resistors with a resistance of R2. That is, a sum of the resistance of the resistors R1a and R2a equals a resistance of the serial resistor (R1b+R2b) in the load circuit 54.

Figure 6:
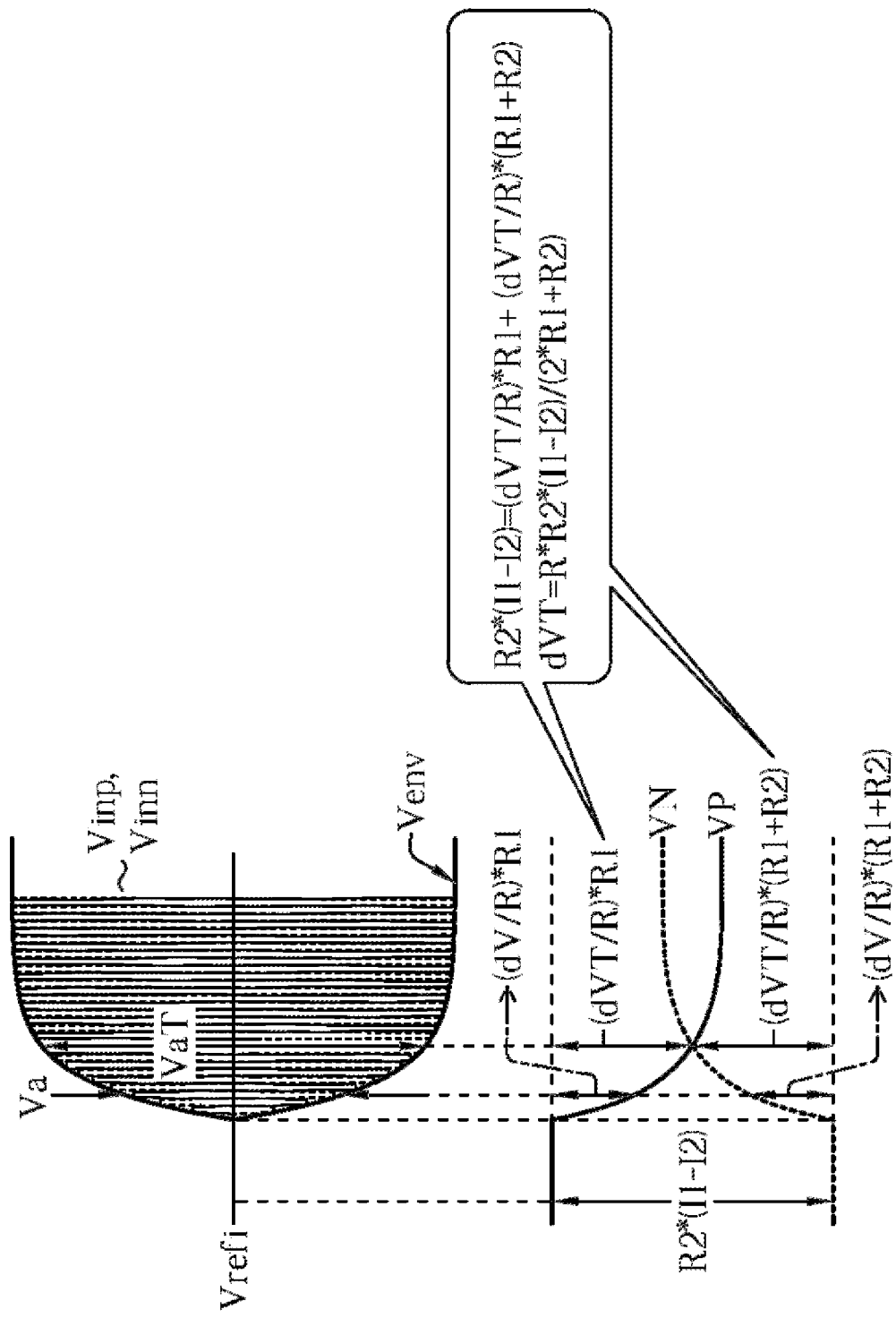
FIG. 6 is a schematic diagram showing operations of a comparison module in FIG. 4.

FIG. 6 shows a schematic diagram of operations of the comparison module 62 according to an embodiment of the present invention. Operations of the comparison module 62 shall be depicted also with reference to FIG. 4. The buffer circuit 46a reflects the amplitude change in the envelope of the differential signals Vinp and Vinn at the nodes n7 and n1. The integrator 48a integrates the signal (the first input signal) at the node n7, and reflects the integration result (the first integration result) at the node n5. More specifically, the voltage at the node n5 reflects the envelope of the differential signals Vinp and Vinn. Similarly, changes in signal Vrefi are reflected to the nodes n8 and n2 via the buffer circuit 46b. The integrator 48b integrates the signal (the second input signal) at the node n8, and reflects the integration result (the second integration result) to the node n4.

A voltage difference dV between the nodes n1 and n5, and the nodes n2 and n4, is reflected at the resistor R to form the differential current dl. At the node n2, the differential current dl is drawn from the resistors R1b and R2b via the node n2 due to a bias current provided by the current sources 42b and 44b. In contrast, at the node n1, the differential current dl is injected into the resistor R1a via the node n1 due to a bias current provided by the current sources 42a and 44a.

As shown in FIG. 6, supposing the envelope signal Venv of the differential signals Vinp and Vinn and the signal Vrefi are of a same level (i.e., when the amplitude Va is 0), the voltages at the nodes n1 and n2 are the same and the voltages at the nodes n4 and n5 are the same, and currents Ia and Ib (FIG. 4) of the transistors N1 and N2 are the same, the differential current is dl is then zero. A current flowing through the resistors R1a and R2a is (I1−I2), while a current flowing through the resistors R2a and R2b is also (I1−I2). Since the two serially connected resistors R1b and R2b provides a resistance of (R1+R2) between the nodes n4 and n2 while the one resistor R1a only provides a resistance of R1 between the nodes n3 and n1, the voltage signal VP at the node n3 is greater than the signal VN at the node n4 by a voltage (I1−I2)*R2. More specifically, when the envelope level of the signals Vinp and Vinn equals that of the signal Vrefi, between the signals VP and VN is a voltage difference (I1−I2)*R2, and the comparator 58 correspondingly provides a comparison result of the signal VP greater than the signal VN.

When the envelope amplitude Va is enlarged while the signal Venv deviates from the signal Vrefi, the voltage difference dV increases to form a non-zero differential current dl at the resistor R. The differential current dl drawn from the node n2 increases the level of the signal VN by (dV/R)*(R1+R2). Conversely, the differential current dl from the node n1 into the resistor Ra1 reduces the signal VP by (dV/R)*R1. That is to say, the voltage difference between the signals VP and VD gradually decreases from the voltage difference (I1−I2)/*R2. When the voltage difference dV reaches a reverse voltage difference dVT, the voltage difference between the signals VP and VN reduces from the original voltage difference (I1−I2) *R2 to zero. Hence, the reverse voltage difference dVT satisfies the equation: (I1−I2)*R2=(dVT/R)*R1+(dVT/R)* (R1+R2), and it can be obtained that dVT=(I1−I2)*R*R2/

(2*R1+R2). When the voltage difference dV equals the reverse voltage difference dVT, the value of the amplitude Va at this point may be regarded as a threshold amplitude VaT. Once the voltage difference dV exceeds the reverse voltage difference dVT, the signal VN becomes greater than the signal VP to indicate that the envelope amplitude Va is large enough (greater than the threshold amplitude VaT), so that the signals Vinp and Vinn are determined as carrying data.

More specifically, the voltage difference dV between the nodes n1 and n2 reflects a size of the amplitude Va (the deviation between the envelope signal Venv and the signal Vrefi). When the voltage dV is smaller than the reverse voltage difference dVT, the signal VN is smaller than the signal VP, which infers that the amplitude Va is smaller than the threshold amplitude VaT, so that the signals Vinp and Vinn are determined carrying only noise. In contrast, when the voltage difference dV is greater than the reverse voltage difference dVT, the signal VN is greater than the signal VP, which infers that the amplitude Va is greater than the threshold amplitude VaT, so that the signals Vinp and Vinn are determined carrying data.

Figure 7:
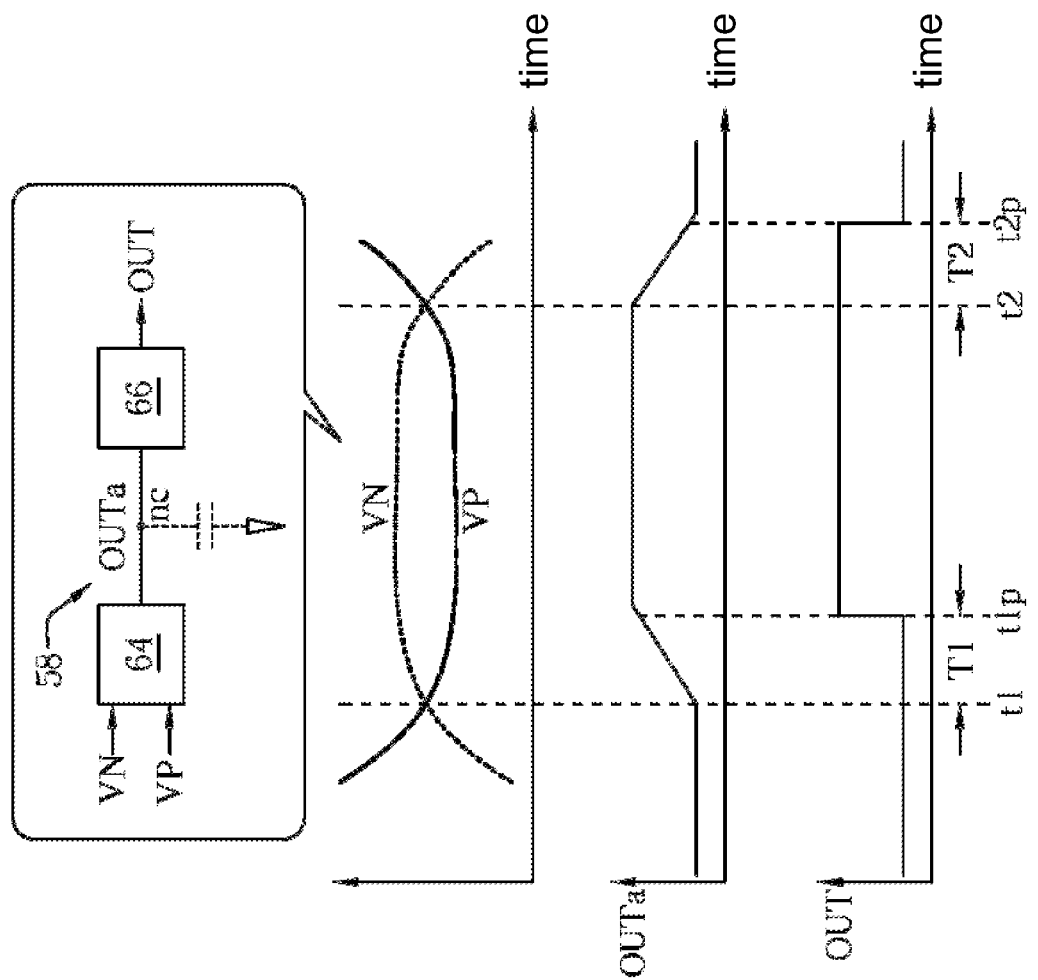
FIG. 7 is a schematic diagram showing operations of a comparator in FIG. 4.

FIG. 7 shows a schematic diagram of the comparator 58 providing a squelch detection signal OUT according to an embodiment of the present invention. In an embodiment, the comparator 58 comprises an analog block 64 and a digital block 66. The analog block (i.e., an integration circuit such as a differential amplifier) compares the signals VP and VN, and accumulates a signal OUTa (an integration signal) at a node nc (e.g., a node with a significant capacitor) capable of integration. The digital block 66 generates the digital signal OUT (e.g., a single-bit digital signal) according to the signal OUTa. As shown in FIG. 7, the signal VP is greater than the signal VN before a time point t1, and becomes smaller than the signal VN at the time point t1 to accumulate the signal OUTa at the node nc. The signal OUTa is accumulated to become greater than a predetermined value at a time point t1p to trigger the digital block 66 to reverse a logic level of the signal OUT, so as to command the a digital data circuit (not shown) in the chip to start retrieving data in the differential signals Vinp and Vinn. In other words, within a period between the time point t1 at which the signal VP starts to be smaller than the signal VN and the time point t1p at which data retrieval starts, the comparator 58 may induce a delay period T1. It is to be noted that such delay period is specified in many current IO signal standards, and the behavior of the comparator exactly conforms to the signal standards.

In contrast, when the signal VN starts to become smaller than the signal VP at the time point t2, the analog 64 starts continuously lowering the signal OUTa. The signal OUTa becomes smaller than another predetermined value at a time point t2p, and the digital block 66 is triggered to reverse the signal OUTa so that the digital block 66 stops retrieving data in the signals Vinp and Vinn. Thus, between the time points t2 and t2p is also a delay period T2. The delay periods T1 and T2 may be the same or different. For example, the delay period T2 is shorter than the delay period T1.

For that the signals VP and VN respectively correspond to the integrations results of the integrators 48a and 48b, the signals VP and VN are relatively low-frequency signals compared to the signals VP and VN. Therefore, the comparator 58 may be a low-cost, low-power consumption and small-layout-sized low-frequency (direct-current) comparator instead of a high-frequency comparator.

Again with reference to FIG. 4 and FIG. 6, it is observed from FIG. 6 that, the reverse voltage difference dVT is associated with the resistors R and R1 (i.e., the resistance of the resistors R1a and R1b), the resistor R2 (i.e., the resistance of the resistors R2a and R2b), the current I1 (i.e., the current provided by the current sources 42a and 42b), and the current I2 (i.e., the current provided by the current sources 44a and 44b). Therefore, when designing the comparison module 62, the threshold amplitude VaT is first determined according to the characteristics and specifications of the signals Vinp and Vinn, and a target value of the reverse voltage difference dVT is then determined according to the threshold amplitude VaT. Values of the resistors R, R1, R2 and the currents I1 and I2 are then reversely inferred according to the known reverse voltage difference dVT. For example, the value of the reverse voltage difference dVT may be changed by adjusting the value of the resistor R. Furthermore, because the threshold amplitude VaT (and the amplitude Va) is reflected in the reverse voltage difference dVT (and the voltage difference dV) via the buffer modules 46a and 46b, a relationship between the threshold amplitude VaT and the reverse voltage difference dVT can be changed by changing the values of the current I1 and/or the current I2. The transistors P1a, P1b, P2a, and P2b in the buffer modules 46a and 46b are controlled by the direct-current voltage of the currents I1 and I2. By changing the currents I1 and I2, the transconductances of the transistors P1a, P1b, P2a, and P2b are changed to further change the relationship between the threshold amplitude VaT and the reverse voltage difference dVT.

Figure 8:
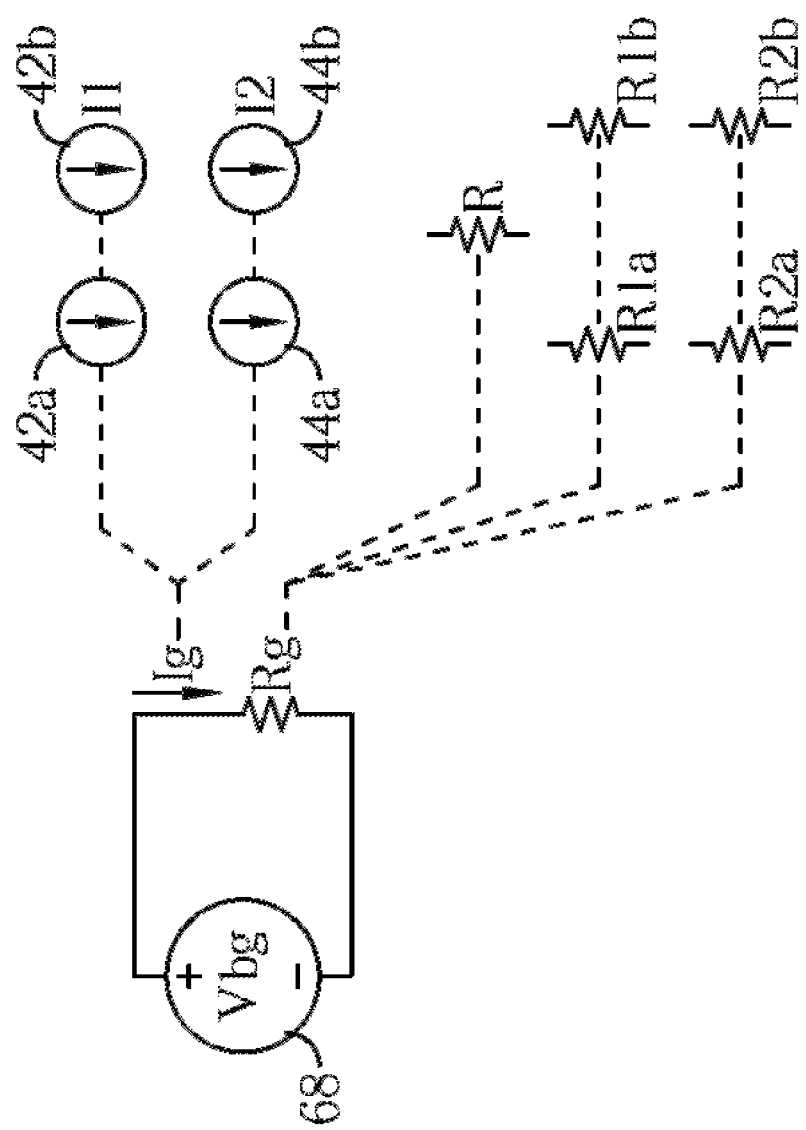
FIG. 8 is a schematic diagram of a comparison module operating in conjunction with a bandgap reference voltage supply according to an embodiment of the present invention.

Since the reverse voltage difference dVT is associated with a product of current and resistance, a bandgap voltage may be utilized to allow the reverse voltage difference dVT to be resistant against temperature as well as effects of operating voltage and manufacturing process drift. FIG. 8 shows a schematic diagram of the comparison module 62 operating in conjunction with a bandgap reference voltage supply 68 according to an embodiment of the present invention. The bandgap reference voltage supply 68 provides a stable bandgap voltage Vbg that is resistant against temperature as well as effects of operating voltage and manufacturing process drifts. The bandgap voltage Vbg establishes a current Ig at a resistance Rg. Via the bandgap voltage Vbg, a product of the current Ig and the resistance Rg also becomes resistant against temperature as well as effects of operating voltage and manufacturing process drifts. For example, supposing the resistance Rg is increased (greater than an expected target value at the time of circuit designing) due to manufacturing process drifts, the current Ig correspondingly decreases for that the bandgap voltage Vgb is resistant against manufacturing process drifts and maintained constant, so that the product Ig*Rg of the current and resistance is maintained at a stable value.

In the comparison module 62, the current I1 provided by the current sources 42a and 42b as well as the current I2 provided by the current sources 44a and 44b are mirrored and scaled from the current Ig, so that the currents I1 and I2 can both be changed as the current Ig varies. Similarly, the resistance Rg, the resistors R, R1a, R1b, R2a, and R2b may be resistors made according to a same manufacturing process in a same chip, so that the resistors R, R1a, R1b, R2a, and R2b can also be changed as the resistance Rg varies. Therefore, the current-resistance product associated with the reverse voltage difference dVT is also given with a same resistance against drifts, meaning that the reverse voltage difference is equally resistant against temperature as well as effects of operating voltage and manufacturing process drifts.

In conclusion, compared to the prior art, the present invention realizes squelch detection of high-frequency (high-bandwidth) signals by utilizing a low-power consumption and small-sized circuit structure and a low-speed (direct-current)

comparator, thereby reducing costs and chip resources (e.g., layout area and power consumption) of squelch detection.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An envelope detector, for performing squelch detection on a pair of differential signals to generate a squelch detection signal, the envelope detector comprising:
    a voltage divider, for generating a real-time reference signal according to the pair of differential signals; and
    a comparison module, for comparing the real-time reference signal with a first comparison signal and a second comparison signal associated with the pair of differential signals to generate the squelch detection signal, comprising:
        a transfer circuit, coupled between a first node and a second node, for providing a differential current according to the pair of differential signals and the real-time reference signal;
        a first load circuit, coupled to the first node and a third node, comprising a first resistor, for providing the first comparison signal according to a voltage formed at the first resistor by the differential current;
        a second load circuit, coupled to the second node and a fourth node, comprising a serial resistor, for providing the second comparison signal according a voltage formed at the serial resistor by the differential current; a resistance of the serial resistor being different from that of the first resistor; and
        a comparator, coupled to the third node and the fourth node, for comparing the first comparison signal and the second comparison signal to generate the squelch detection signal;
        wherein, the first comparison signal and the second comparison signal are low-frequency signals.

2. The envelope detector according to claim 1, wherein the real-time reference signal is associated with a real-time sum of the pair of differential signals.

3. The envelope detector according to claim 1, wherein the comparison module further comprises:
    a third load circuit, coupled to the third node and a fifth node;
    a first integrator, coupled to the fifth node and a seventh node, for integrating a first input signal associated with the pair of differential signals to generate a first integration result; and
    a second integrator, coupled to the fourth node and an eighth node, for integrating a second input signal associated with the real-time reference signal to generate a second integration result;
    wherein, the first integration result is associated with the first comparison signal, and the second integration result is associated with the second comparison signal.

4. The envelope detector according to claim 3, wherein the third load comprises a second resistor, and a total resistance of the first resistor and the second resistor equals a resistance of the serial resistor.

5. The envelope detector according to claim 3, wherein the first integrator comprises:
    a first integration transistor, having a drain and a gate respectively coupled to the fifth node and the seventh node; and
    a first capacitor, coupled to the fifth node and the seventh node;
    and the second integrator comprising:
    a second integration transistor, having a drain and a gate respectively coupled to the fourth node and the eighth node; and
    a second capacitor, coupled to the fourth node and the eighth node.

6. The envelope detector according to claim 5, the comparison module further comprising:
    a first current source, coupled to the first node;
    a second current source, coupled to the second node;
    a third current source, coupled to the seventh node; and
    a fourth current source, coupled to the eight node;
    wherein, a current difference between the first current source and the third current source equals that between the second current source and the fourth current source.

7. The envelope detector according to claim 3, the comparator further comprising:
    a first buffer circuit, comprising a pair of first input ends and a first coupling end, for generating the first input signal according to the pair of differential signals; the pair of first input ends being coupled to the pair of differential signals, and the first coupling end being coupled to the first integrator; and
    a second buffer circuit, comprising a second input end and a second coupling end respectively coupled to the real-time reference signal and the second integrator, for generating the second input signal according to the real-time reference signal.

8. The envelope detector according to claim 7, wherein the first buffer circuit comprises:
    a pair of first transistors, having gates respectively coupled to the pair of first input ends, drains coupled to the first coupling end, and sources coupled to the first node;
    and the second buffer circuit comprising:
    a pair of second transistors, having gates coupled to the second input end, drains coupled to the second coupling end, and sources coupled to the second node.

9. An envelope detector, for performing squelch detection on a pair of differential signals to generate a squelch detection signal, the envelope detector comprising:
    a voltage divider, for generating a real-time reference signal according to a common mode part of the pair of differential signals; and
    a comparison module, for comparing the real-time reference signal with an envelope level of an envelope of the pair of differential signals to generate the squelch detection signal, comprising:
        an integration circuit, comprising a node capable of integration, for integrating an integration signal associated with a difference between the envelope level of the pair of differential signals and the real-time reference signal; and
        a digital block, for reversing a logic level of the squelch detection signal when the integration signal is greater than a predetermined value associated with the pair of differential signals;
    wherein, the real-time reference signal and the pair of differential signals are low-frequency signals.

10. A method for envelope detection, for performing squelch detection on a pair of differential signals to generate a squelch detection signal, the method comprising:

generating a real-time reference signal according to the pair of differential signals;

comparing the real-time reference signal with a first comparison signal and a second comparison signal associated with the pair of differential signal to generate the squelch detection signal, wherein the first comparison signal and the second comparison signal are low-frequency signals;

providing a differential current according to the pair of differential signals and the real-time reference signal;

providing the first comparison signal according to a voltage formed at a first resistor by the differential current;

providing the second comparison signal according to a voltage formed at a serial resistor by the differential current; a resistance of the serial resistor being different from that of the first resistor; and comparing the first comparison signal and the second comparison signal to generate the squelch detection signal.

11. The method according to claim 10, wherein the real-time reference signal is associated with a real-time sum of the pair of differential signals.

12. The method according to claim 10, further comprising:

generating a first integration signal according to an integration of the pair of differential signals;

generating a second integration signal according an integration of the real-time reference signal; and providing the differential current according to the first integration signal and the second integration signal.

\* \* \* \* \*